April 20, 1965

W. W. BURNHAM 3,179,755

CONTROL APPARATUS USING UNIVERSALLY MOUNTED
HANDLE AND NOTCHED SHAFTS

Filed Jan. 16, 1963

INVENTOR.

WILLIAM W. BURNHAM

BY

*James P. Malone*

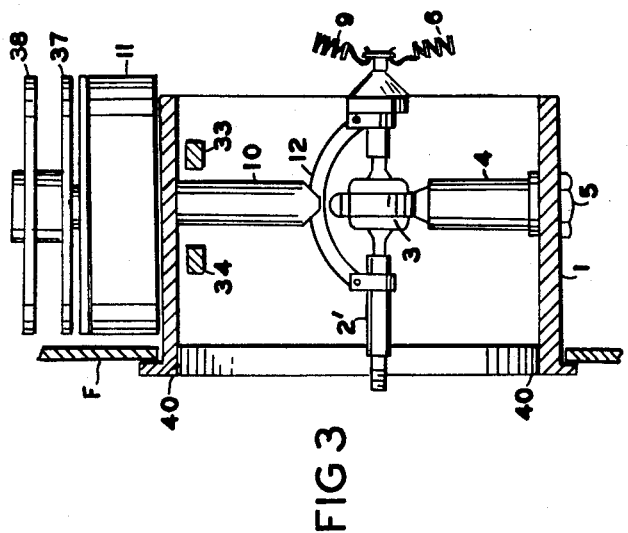
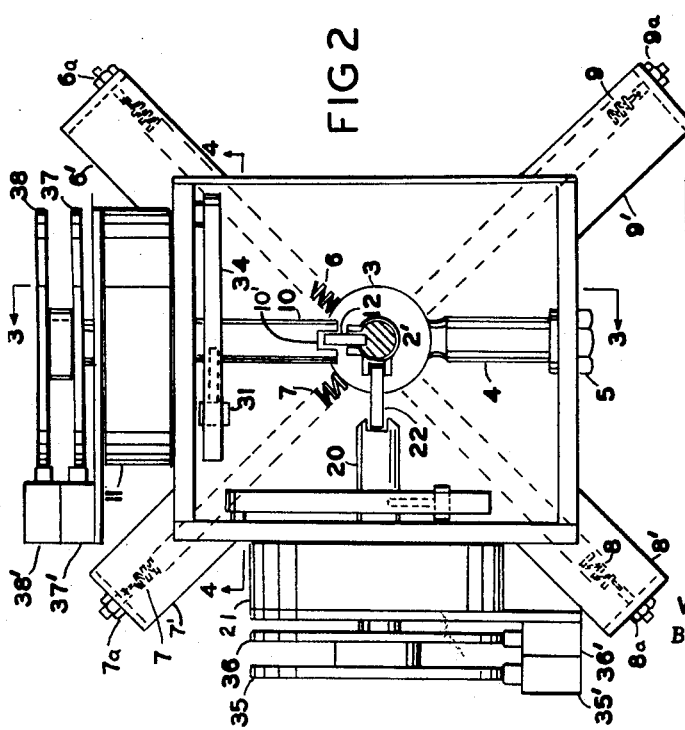
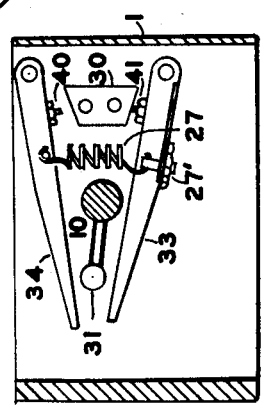

United States Patent Office 3,179,755
Patented Apr. 20, 1965

3,179,755
CONTROL APPARATUS USING UNIVERSALLY
MOUNTED HANDLE AND NOTCHED SHAFTS
William W. Burnham, Mineola, N.Y., assignor to
OPTOmechanisms, Inc., Plainview, N.Y.
Filed Jan. 16, 1963, Ser. No. 251,960
1 Claim. (Cl. 200—6)

This invention relates to handle switch means for controlling several motors or servo controls for moving controlled object or objects in a plurality of directions.

In many applications it is desirable to move one or more objects, such as pickups in a photoviewing device such as shown in patent application, Serial No. 97,480, filed March 22, 1961, entitled Remote Film Viewer. That application shows a viewer for viewing large films for instance, in the measurement and interpretation of aerial photographs and surveys.

The viewer generally comprises a film handling table with suitable readout equipment which may be of the digital type for noting measurements. A film table contains the film, illumination sources, transport mechanisms, the X-Y axis carriages, and mechanical drives required for the coordinate readout. Two objective systems and fiber optic cables transmit the information from the two frames of film to the control table stereo viewing optics.

The control panel contains the eyepieces for viewing as well as all the controls necessary for the operator to view and record the desired portions of the film. This is made possible by using fiber optics to transmit the image from the film to the control table. The above mentioned prior application is suitable for feeding digital readout means and means for display, control, recording, or other utilization of date obtained by the viewer.

One of the problems in utilizing a photoviewer or other equivalent mechanisms wherein the pickups have perpendicular movement axes is that it is difficult to follow targets which travel at an angle to those reference axes.

For instance, as illustrated in the before mentioned patent application, there are optical pickups suspended over the film to be viewed which are moved along X and Y axes which are perpendicular to each other by means of lead screw mechanisms. Now if the operator wishes to move the pickup or pickups so as to move in a direction at an angle with respect to the reference axes then he generally has to use both hands in a highly coordinated manner, each hand controlling motion along one of the reference axes.

The present invention solves the problem by providing a single handle, which may be called a joy stick, which is adapted to control the movements of one or both the pickups along both axes at the same time at any desired angle. The handle is vertically mounted and may be depressed in any angular direction. The X and Y components of the desired direction are sensed by pickups and switches connected to the handle so that information is fed to the X and Y axes servo motors which will cause the pickup or follow up to move at the angle indicated by the motion of the handle. Additional switching means are incorporated in the handle for selecting one or more pickup or followers for motion and additional switching means are also provided for providing high speed and or low speed movement. The speed is proportioned to the deflection of the handle. Very high slewing speed is also provided.

The present invention has been discussed in connection with movable optical pickups in a photoviewer, however the handle switch means by the present invention has many equivalent applications, where an object is controlled in direction.

Accordingly a principal object of the invention is to provide new and improved control handle switching means.

Another object of the invention is to provide new and improved joy stick switching means which are adapted to control a follower which is mounted for movement along two perpendicular axes so as to cause the follower to follow at an angle indicated by the handle.

Another object of the invention is to provide single hand control means for tracking one or more followers along an angle indicated by depressing a handle.

Another object of the invention is to provide single hand control means for tracking one or more followers along an angle indicated by depressing the handle and having a switch at the top for selecting one or more followers.

Another object of the invention is to provide single hand control means for tracking one or more followers along an angle indicated by depressing the handle, said handle having a switch at the top for selecting one or more followers and having a switch on the side for controlling high speed operation.

Another object of the invention is to provide single hand control means for tracking one or more followers along an angle indicated by depressing the handle wherein the follower speed is proportional to the deflection of said handle.

These and other objects of the invention will be apparent from the following specifications and drawings of which:

FIGURE 2 is a plan view partly in section of an embodiment of the invention.

FIGURE 3 is a sectional view taken along the lines 3—3 of FIGURE 2.

FIGURE 4 is a sectional view taken along the lines 4—4 of FIGURE 2.

Figure 1:
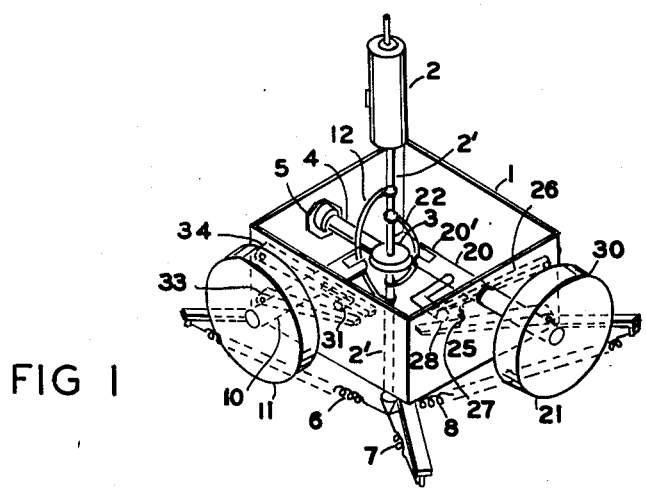
FIGURE 1 is a perspective view of an embodiment of the invention.

FIGURE 1 shows a perspective view of the embodiment of the invention generally comprising a frame member 1, which is stationary and fixedly connected to the chassis of the apparatus. The control handle 2, called the joy stick, is mounted substantially vertically in the universal joint 3 which is a modified ball and socket joint. The outer body of the universal joint is fixedly connected by the member 4 and nut 5 to one side of the frame 1. The handle shaft 2' extends through the ball and socket and is spring loaded, preferably in four equally spaced directions, to the frame 1 by means of the springs 6, 7, 8, etc. A first control shaft 10 is rotatably mounted on one side of the frame and has mounted on its outer end a potentiometer 11. The shaft 10 may also have left and right or up and down control switches which are not shown in FIGURE 1 but are shown in FIGURES 2, 3, and 4.

The inner end of the shaft 10 has a fork 10' through which passes a projecting loop member 12 which is fixedly connected at its end to the shaft 2' of the handle 2.

A second control shaft 20 is rotatably mounted on the frame 1 at the angle of 90° to the first control shaft 10. The potentiometer 21 is mounted on its outer end. The inner end of the shaft 20 has a fork 20' which engages a projection 22 which is connected to the shaft 2'.

Therefore, as the handle is pivotally moved about its pivot point on the ball and socket, its movement at any angle will transmit X and Y components to shafts 10 and 20 by means of connecting loop members 12 and 22 mounted at 90° angle to each other. The control members have been described as potentiometers, however, they may also include left and right switch means as will be described hereafter.

Means are also provided for positively returning the control shafts to neutral position when the handle is turned to neutral position. These means comprise a pair of pivotally mounted arms 25 and 26 which are spring loaded together by means of spring 27. The arms 25 and 26 squeeze between them a projecting member 28 which is fixedly connected to the arm 20. An adjustable stop means 30 is provided for the arms 25 and 26 as will be described thereafter.

The control shaft 10 also has a projecting member 31 which is similarly controlled by the spring loaded arms 33 and 34.

The frame 1 is shown as a square box however, it may have a circular shape so that it may be mounted for rotation of its zero reference with respect to the chassis as will be explained. The shape of the frame 1 is not otherwise important provided the control shafts 10 and 20 axes are mounted at an angle of 90° to each other.

FIGURE 2 shows a plan view and FIGURES 3 and 4 shown sectional views of the embodiment of FIGURE 1 with the handle 2 cut off. It generally comprises a frame 1 which is shown as a four sided stationary frame. The ball and socket joint or universal joint 3 is fixedly mounted to the frame by means of the member 4 and the nut 5. The projecting member 12 is fixedly mounted to the shaft 2', while member 22 is rotatably mounted to shaft 2'. The control shafts 10 and 20 are rotatably mounted on the adjacent sides of the frame 1 at an angle of 90° to each other. The potentiometers 11 and 21 are mounted on the control shafts 10 and 20 respectively. The lower end of the handle shaft 2' is spring loaded to the frame by means of the springs 6, 7, 8, and 9, which are connected to the lower end of the shaft 2' at one end and to the ends of the brackets 6', 7', 8', and 9', at their other end by means of adjustable screws 6a, 7a, 8a, and 9a.

In addition to the showing of FIGURE 1, a pair of cams 35 and 36 are mounted on the shaft 20 and a second pair of cams 37 and 38 are mounted on the control shaft 10. These cams operate switches 35', 36', 37', and 38', when the handle is deflected, for instance 2°. The cam switches are used to make forward and reverse connections to the X and Y servo motors as will be explained. In other words, if the shaft is rotated in one direction the cam 35 will then energize the switch 35' to turn the motor in one direction but if the shaft 20 is turned in the other direction than the cam 36 will energize the switch 36' to turn the motor in the other direction. Switches 37' and 38' are similarly connected to drive the servo motor on the axis. A single cam of composite shape can also be used. The potentiometers are used for speed control of the motors, so that the amount of deflection of the handle 2 controls speed of the servo motors.

Positive means are provided to center the control shafts as follows:

The control shaft 10 has a projection 31 which is sandwiched between the arms 34 and 33 which are pivotally mounted on the frame member. The arms 33 and 34 are pressed together by means of the spring 27 which is connected to one arm 33 and at the other end to the arm 34 by means of the adjustment screw 27'. The arms 33 and 34 are set in reference position by means of the adjustment screws 40 and 41 which are adapted to bear against the block 30 mounted on the frame 1, as illustrated in FIGURE 4.

In many cases it may be desirable to change the direction of the joy stick to correspond to the motion of the film relative to the observed magnified image.

The frame 1 may be made circular and adapted to be rotatably mounted on the chassis or main frame F by means of the annular lip ring mounting like 40 in FIG. 3. If the frame 1 is rotatably mounted then its zero position may be changed with respect to the chassis. This arrangement is useful for instance in the interpretation of aerial photographs, since the plane may be flying at any heading it is generally very desirable to convert the coordinate readout of points measured on the photographs to a North reference, for North, South and East West coordinate information. This may be done by setting the angle of the frame 1 with respect to the chassis at the flight heading. For instance, the plane may be flying at a bearing of 120°. Now if it is desired to measure coordinates of points on the picture with reference to North in a positive direction, the frame 1 is set to the flight heading. Then the pickup may be moved from point A on the photograph to point B on the photograph and give the proper magnitude and direction of the distance between them to automatic recording equipment which information is referred to North-South and East-West references. Thus, at 180° setting of the frame, moving the joy stick to the right moves the carriage to the left; moving it up, moves the carriage down and so on. In the 90° setting, moving the joy stick to the right moves the carriage by 90° (this is, down); moving it up moves the carriage to the right, and so on.

This arrangement is useful also where one or more images is adjusted in angle in the photoviewer. This adjustment may be made by rotating one end of the fiber optical cable and is sometimes made to study pictures, made at different flight headings. When the images are rotated optically it is then desirable to adjust the movement control to the same angle as the optical adjustment, so that the control of pickup movements is coordinated with the viewer of the picture.

Figure 5:
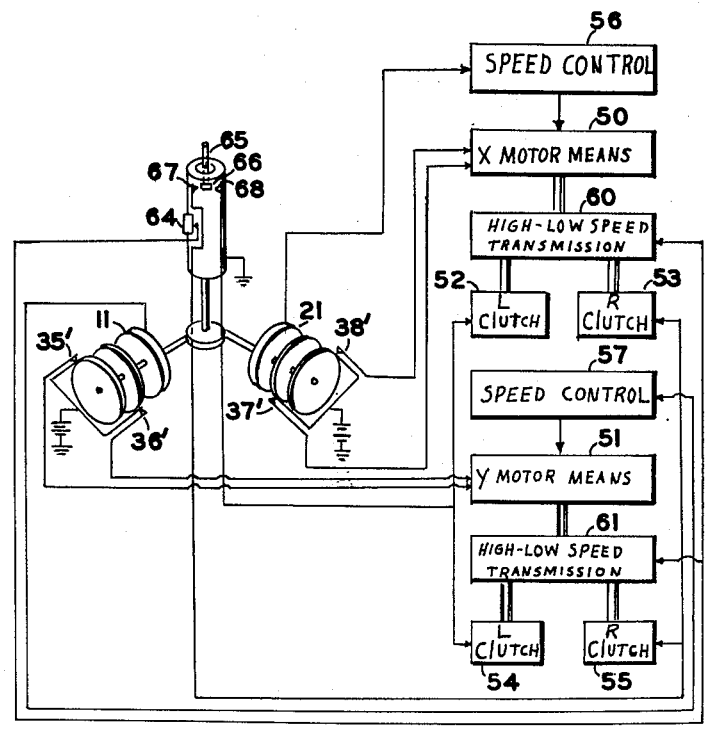
FIGURE 5 is a schematic circuit diagram.

FIGURE 5 shows a schematic block view diagram of typical circuits, for instance in the photoviewer of the previously mentioned application.

The circuit includes X-axis motor means 50, and Y-axis motor means 51. The X-axis motor means is connected to the left and right pickups by means of clutches 52 and 53. The Y-axis motor means is connected to the left and right pick-ups by means of the clutches 54 and 55. The X-axis speed control 56 is controlled by the potentiometer 21 and the Y-axis speed control 57 is controlled by the potentiometer 11.

The switches 37' and 38' are connected to control the direction of the X-axis motor means and the switches 35 and 35' are similarly connected to the Y motor means 57.

High speed slewing transmissions 60 and 61 are provided for X and Y motor means. The slewing speed is energized by the push button switch 64.

The selector switch 65 has a center blade 66 which is adapted to contact either contact 67 and 68. When the switch 65 is in neutral position it does not make either of contacts 67 or 68, so that the both pickups are energized in center position. When the switch 65 is moved to one side, contact 67 is made and the left clutches 52 and 54 are de-energized so that only the right pickup is moved by the control stick 2.

When the contact 65 is moved to the other side and contact 68 is made, then the right clutches 53 and 55 are de-energized.

Many modifications may be made by those who desire to practice the invention without departing from the scope thereof which is defined by the following claim.

I claim:

In a system of the type controlling movement of at least one member along two axes at different speeds comprising, a hollow stationary frame, a vertical handle, means to mount said handle within said frame including, universal joint means fixedly connected to said frame member said handle being pivotally mounted for movement in all directions on said joint and extending through said joint to a point below said frame, first spring means to spring load the bottom of said handle to a central position in said frame with respect to two perpendicular axes whereby said handle is normally held substantially vertically, first and second control shafts rotatably mounted in the side of said frame at an angle of 90° to each other, each of said shafts having a forked end adjacent said handle, Second spring means to center said control shafts independently of said first spring means, with respect to said two perpendicular axes, first and second projecting members fixedly connected to said handle and extending through said forked ends of said first and second shafts respectively whereby as said handle is moved in a direction having a component perpendicular to either of said shafts, then said projecting members will rotate said shaft, and motor control means connected to the end of said shafts.

References Cited by the Examiner
UNITED STATES PATENTS

| | | | |
|---|---|---|---|
| 2,762,234 | 9/56 | Dodd | 74—471 |
| 2,861,699 | 11/58 | Youmans | 214—1 |
| 2,985,740 | 5/61 | Fisher et al. | 200—157 |
| 3,028,768 | 4/62 | Bullard | 200—157 |
| 3,095,754 | 7/63 | Mayon et al. | 74—471 |

FOREIGN PATENTS

| | | |
|---|---|---|
| 1,081,821 | 6/54 | France. |

BERNARD A. GILHEANY, *Primary Examiner.*
ROBERT K. SCHAEFER, *Examiner.*